Figure 7:
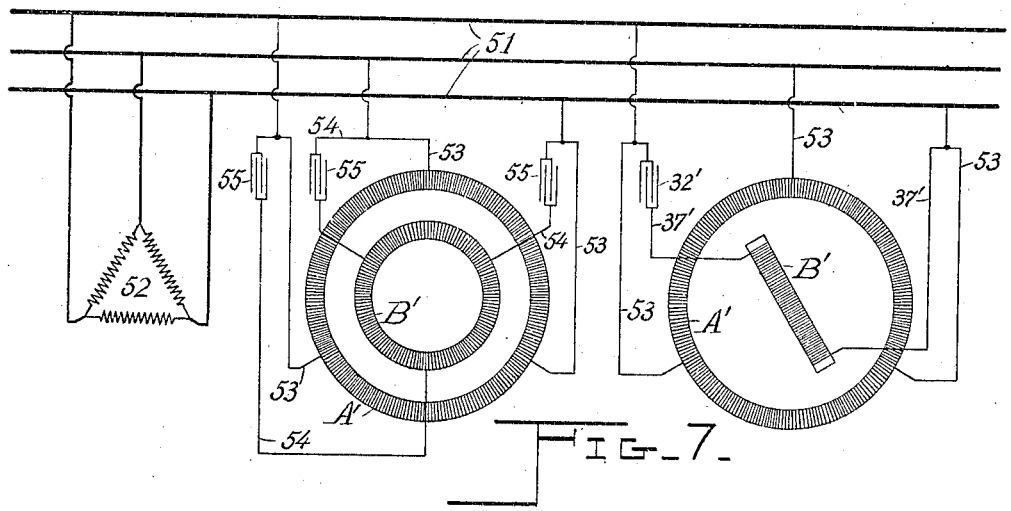

No. 843,267. PATENTED FEB. 5, 1907.
W. H. FREEDMAN.
FREQUENCY METER.
APPLICATION FILED SEPT. 18, 1903.
6 SHEETS—SHEET 1.
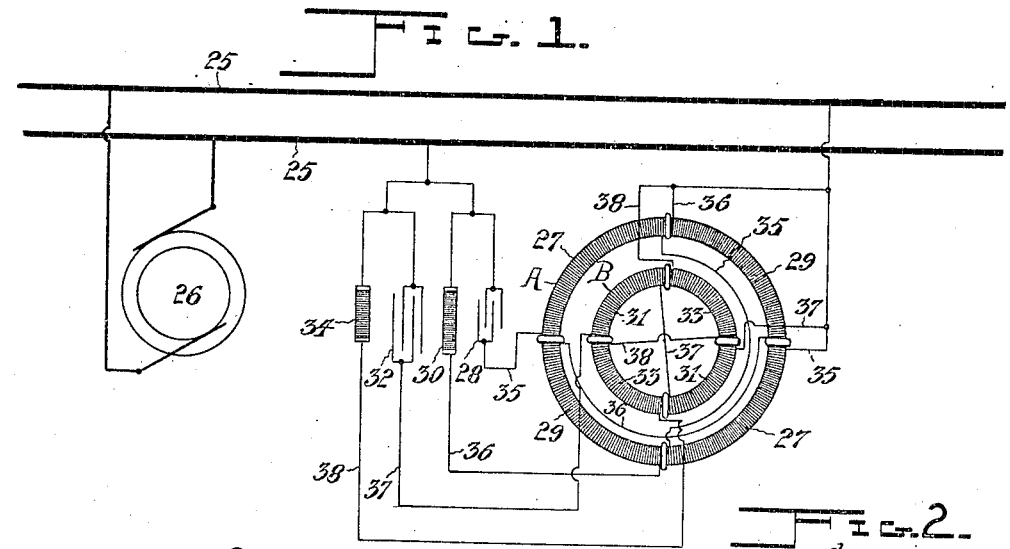
FIG. 1.
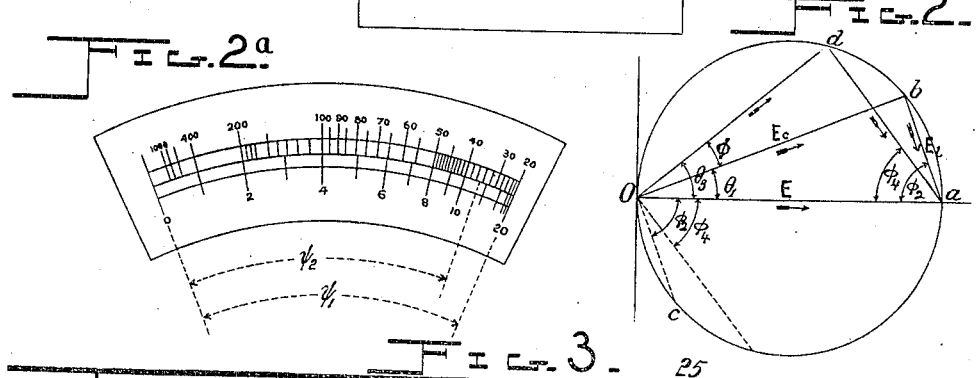
FIG. 2ª FIG. 2.
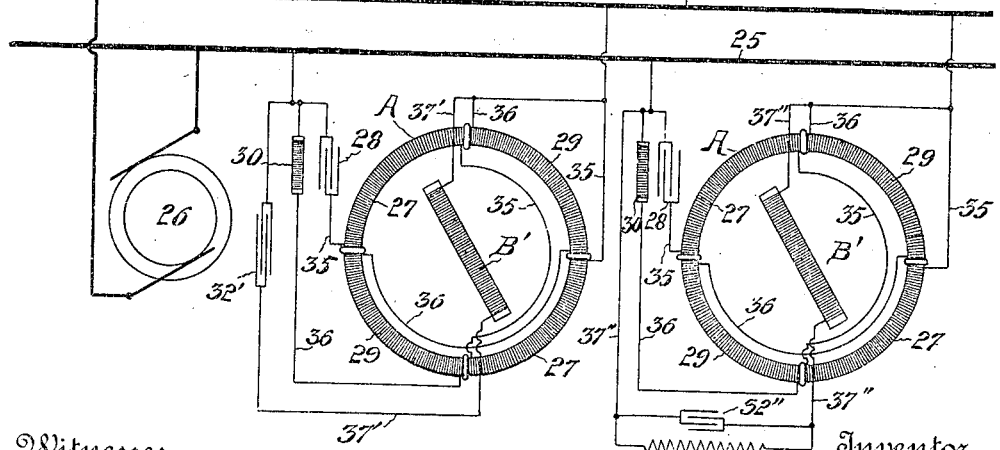
FIG. 3.
Witnesses
John F. Deufferwiel
George W. Colles
Inventor
William H. Freedman
BY
Edward P. Thompson
Attorney No. 843,267.
PATENTED FEB. 5, 1907.
W. H. FREEDMAN.
FREQUENCY METER.
APPLICATION FILED SEPT. 18, 1903.
6 SHEETS—SHEET 2.
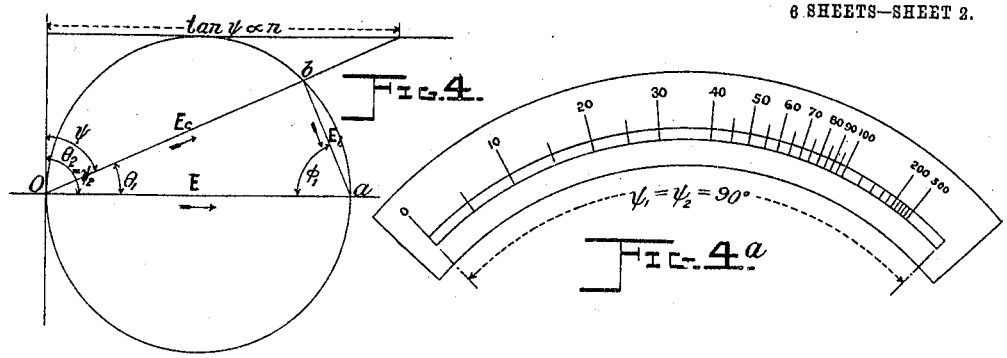
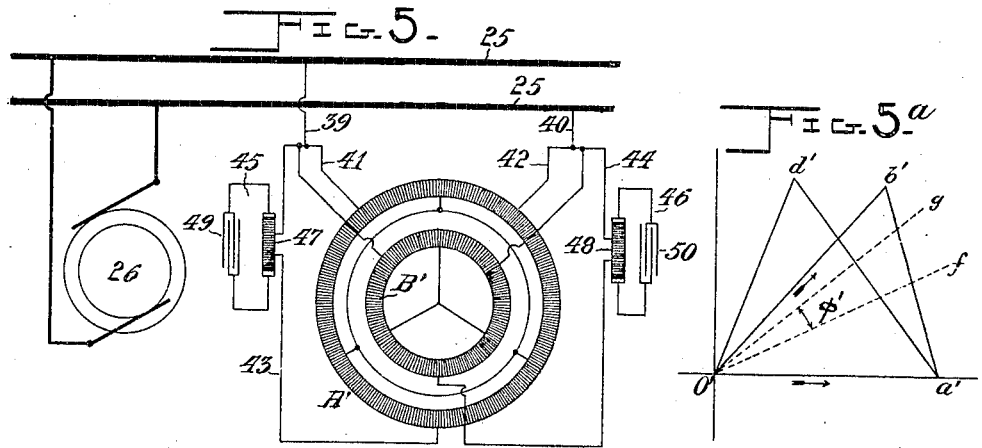
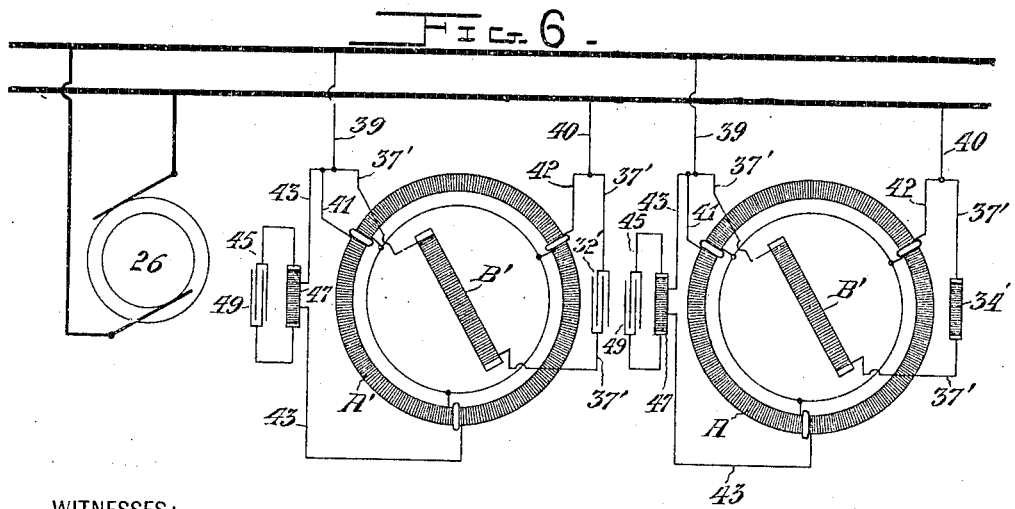
WITNESSES:
INVENTOR
William H. Freedman
BY
Edward P. Thompson
ATTORNEY No. 843,267. PATENTED FEB. 5, 1907.
W. H. FREEDMAN.
FREQUENCY METER.
APPLICATION FILED SEPT. 18, 1903.

6 SHEETS—SHEET 3.

WITNESSES:
John F. Deufferwied
George W. Colles

INVENTOR
William H. Freedman

BY
Edward P. Thompson
ATTORNEY

No. 843,267. PATENTED FEB. 5, 1907.
W. H. FREEDMAN.
FREQUENCY METER.
APPLICATION FILED SEPT. 18, 1903.
6 SHEETS—SHEET 4.
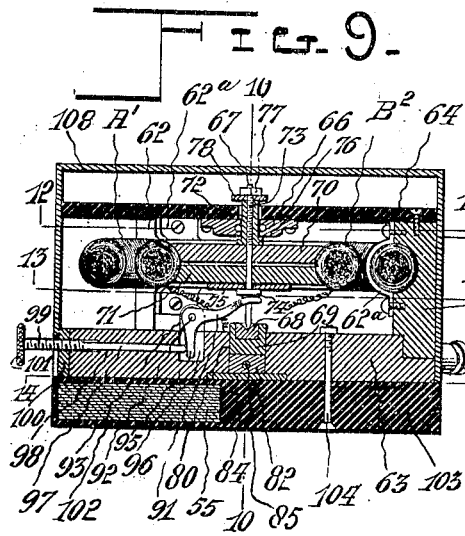
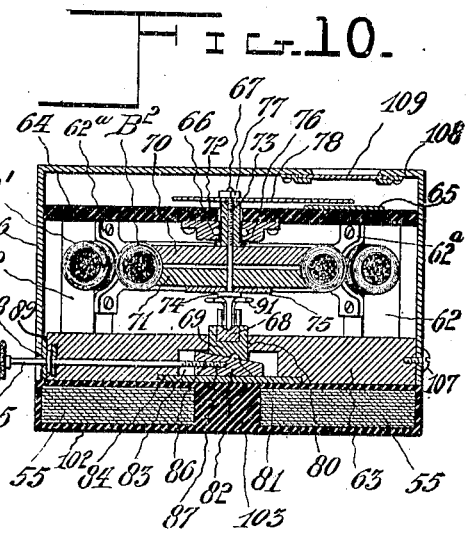
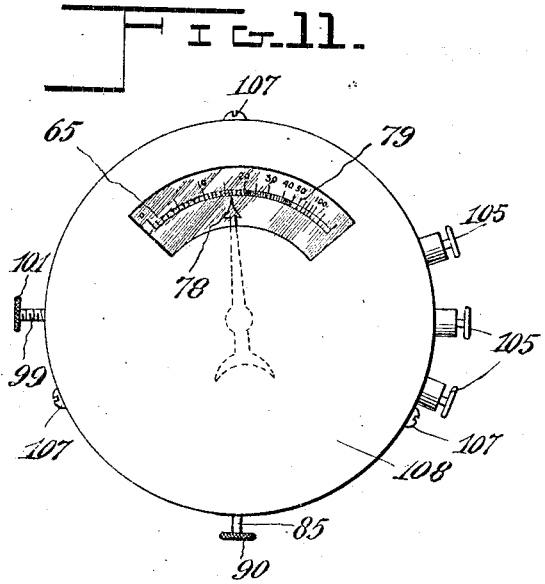
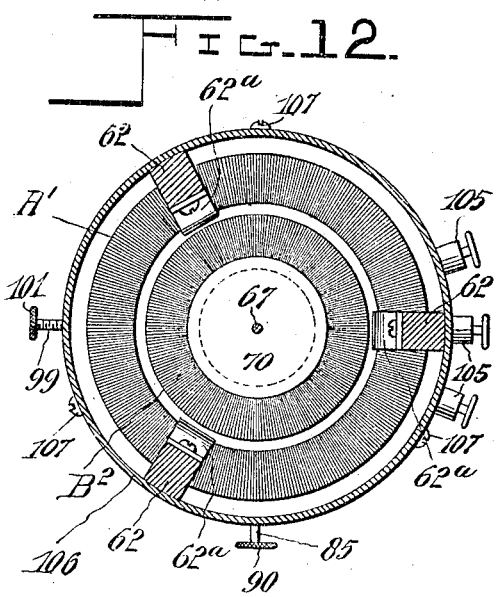
WITNESSES:
INVENTOR
William H. Freedman
BY
Edward P. Thompson
ATTORNEY No. 843,267. PATENTED FEB. 5, 1907.

W. H. FREEDMAN.
FREQUENCY METER.
APPLICATION FILED SEPT. 18, 1903.

6 SHEETS—SHEET 5.

WITNESSES:
John T. Deuflerweid
George W. Colles

INVENTOR
William H. Freedman

BY
Edward P. Thompson
ATTORNEY

No. 843,267. PATENTED FEB. 5, 1907.
W. H. FREEDMAN.
FREQUENCY METER.
APPLICATION FILED SEPT. 18, 1903.
6 SHEETS—SHEET 6.
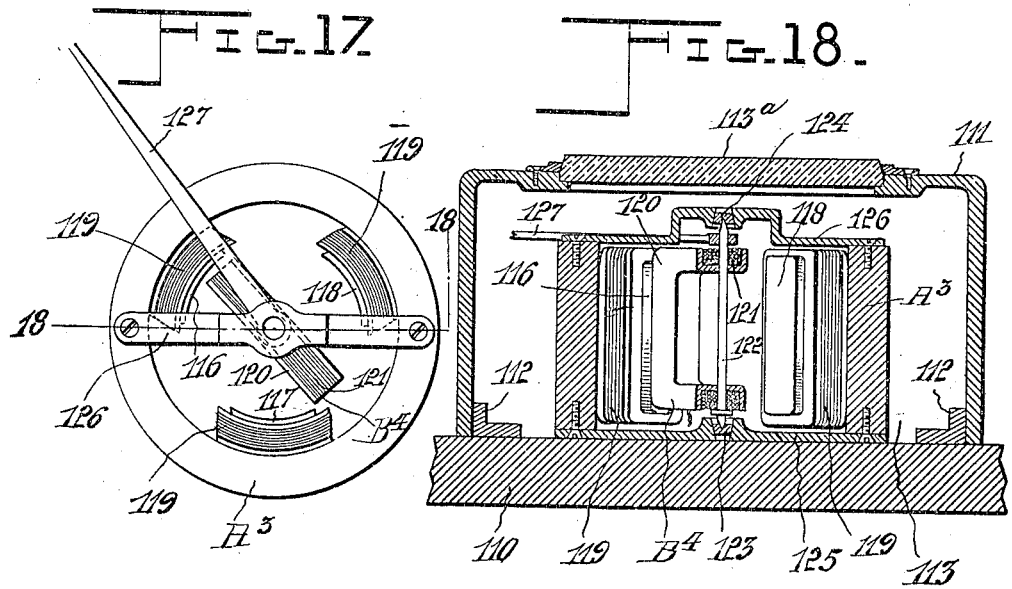
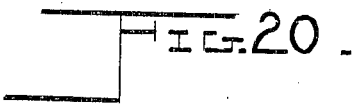
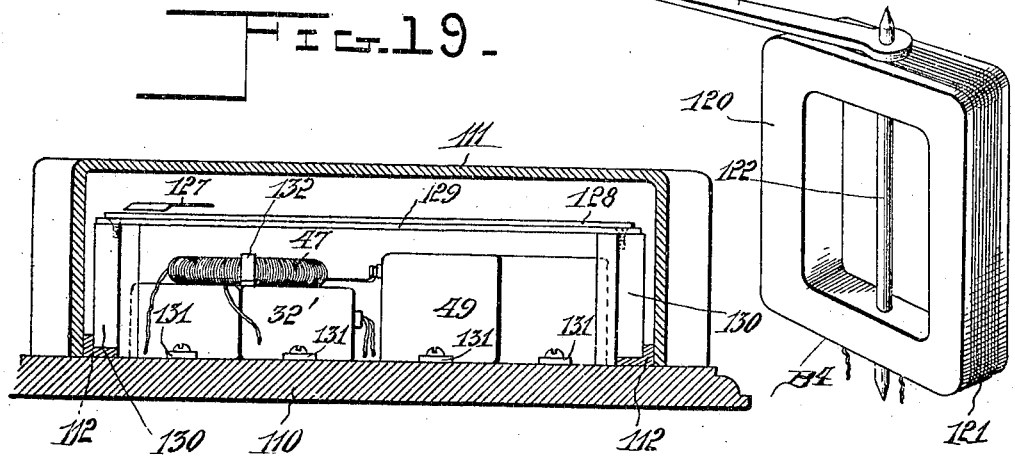
WITNESSES:
John F. Deufferwiel
George W. Colles
INVENTOR
William H. Freedman
BY
Edward P. Thompson
ATTORNEY

UNITED STATES PATENT OFFICE.

WILLIAM H. FREEDMAN, OF BURLINGTON, VERMONT.

FREQUENCY-METER.

No. 843,267.    Specification of Letters Patent.    Patented Feb. 5, 1907.

Application filed September 18, 1903. Serial No. 173,650.

*To all whom it may concern:*

Be it known that I, WILLIAM HORATIO FREEDMAN, a citizen of the United States of America, and a resident of Burlington, in the county of Chittenden and State of Vermont, have invented certain new and useful Improvements in Frequency-Meters, of which the following is a specification.

My invention relates to electric measuring instruments of that class adapted for alternating-current circuits and in particular to means for measuring the frequency of alternation of those circuits; and the object I have in view is to produce a simple and accurate instrument perfectly astatic.

It is well known that a condenser introduced into an alternating-current circuit will produce a certain phase displacement of the current therein, causing it to advance over the electromotive force of the circuit, and that such phase displacement or lead is a simple inverse function both of the capacity of the condenser and of the frequency of the current, or, in other words, $$\text{Angle of lead} = \tan^{-1} \frac{1}{2 \pi n C R},$$

where C is the capacity of the interposed condenser, R the resistance of the circuit, and $n$ its frequency. In my invention I utilize this principle by causing the current of a branch circuit containing a condenser to produce a rotary magnetic field which is caused to orient itself with respect to another magnetic field produced by a parallel branch circuit with no condenser, in such manner as to indicate the amount of phase displacement produced by the condenser, and thus indirectly the frequency of which it is a function, the capacity of the condenser remaining constant.

The embodiment of my invention involves a great variety of possible forms, only a few of which, however, for the sake of conciseness, are herein illustrated; but the various possible modifications can be readily inferred by electrical engineers and others skilled in the art from those described.

Figure 8:
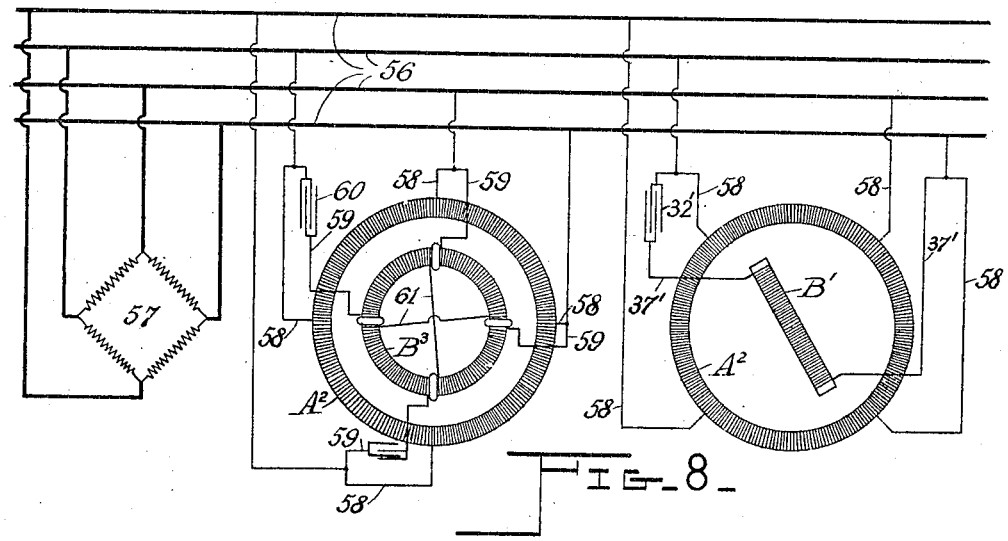
Figure 13:
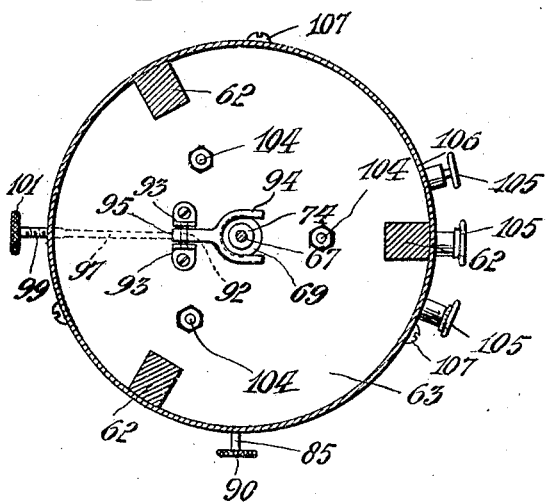
Figure 14:
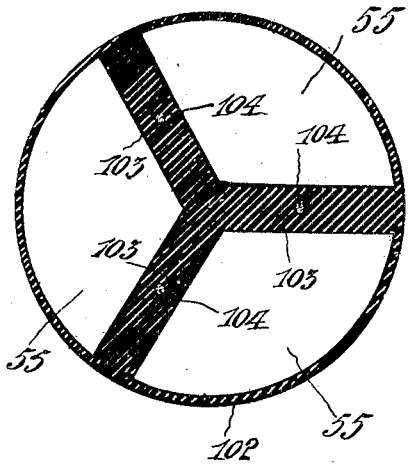
Figure 15:
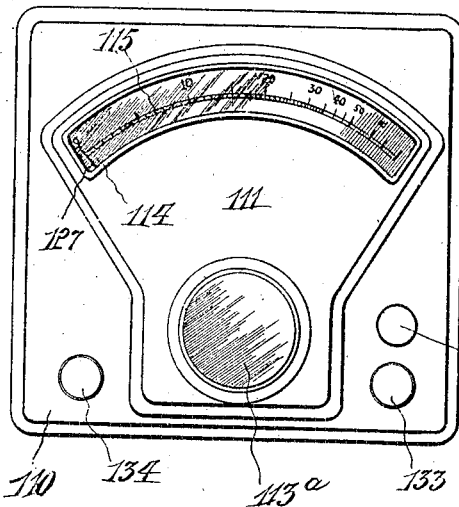
Figure 16:
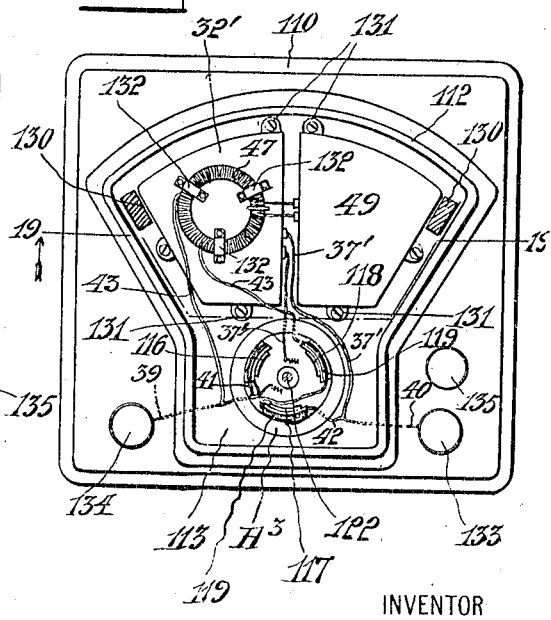

In the accompanying drawings the first eight figures are electrical diagrams of my invention as applied in different cases, and the remainder mechanical constructions, or, more specifically, Figure 1 shows a double-ring instrument connected to a single-phase circuit by a two-phase split connection. Fig. 2 is a phase-diagram to show the mode of action of this form. Fig. 2ª is a scale for a measuring instrument of this form. Fig. 3 shows two arrangements for a ring and bar instrument connected to a single-phase circuit by a two-phase split connection. Fig. 4 is a phase-diagram to show the mode of action of this form. Fig. 4ª is a scale for a measuring instrument of this form. Fig. 5 shows a double-ring instrument connected to a single-phase circuit by a three-phase split connection. Fig. 5ª is a phase-diagram to show the mode of action of this form. Fig. 6 shows two arrangements for a ring-and-bar instrument with three-phase split connection. Fig. 7 shows two forms of the instrument as connected to a three-phase circuit. Fig. 8 shows similar forms connected to a four-phase (two-phase) circuit. Figs. 9 to 14 show one form of mechanical construction adopted by me, chiefly for experimental use, and of these, Figs. 9 and 10 are vertical diametral sections at right angles to each other. Fig. 11 is a plan, and Figs. 12, 13, and 14 are plan sections taken on the lines 12 12, 13 13, and 14 14, respectively, of Fig. 9. Figs. 15 to 20 show a form of the instrument adapted for general use as a portable frequency-meter, and of these Fig. 15 is a plan view of the complete instrument. Fig. 16 is a plan view with the cover and oscillating coil removed. Fig. 17 is a plan of the oscillating coil and pole-ring on an enlarged scale. Fig. 18 is a vertical section taken on the line 18 18 of Fig. 17. Fig. 19 is a vertical section taken on the line 19 19 of Fig. 16, and Fig. 20 is a perspective view of the oscillating coil.

I will first explain the general principle on which my instrument is constructed and afterward explain the preferred mechanical construction. Broadly speaking, it comprises two members which are herein throughout designated A and B or their derived symbols, respectively, one of which is fixed and the other movable, and in at least one of which a rotary magnetic field is produced, while the other is magnetized by a current derived from the same source; but the magnetic field produced in it may be either alternating (pulsating) or rotary. Ordinarily the movable member B is made to rotate about the axis of symmetry of both members, and one of the members is made in the form of a ring or circle of pole-pieces which carry the rotating field. The two members are, as stated, energized by derived currents from the same source and therefore have the same frequency; but they differ essentially in this, that one or more condensers are generally interposed in one of said derived circuits, which cause a phase displacement in that circuit whose tangent is inversely proportional to the capacity and frequency, or else the inductances are made sufficiently different and no condensers employed.

Taking first the case of Fig. 1, I have shown a pair of bus-bars or mains 25 energized by the single-phase alternator 26 and with which the fixed and movable members A and B are each connected in pressure relation. Each member is shown as a ring, the member B arranged to rotate within the member A and each member wound for a two-phase connection derived by any suitable phase-splitting device from the mains 25. As shown, the two opposite coils 27 of the ring A are connected in series with each other and with a condenser 28, while the other pair of coils 29 of A are similarly connected in series with an inductance or choke coil 30. Similarly the coils 31 of B are connected in series with a condenser 32 and the coils 33 with an inductance 34. The values of the capacity and the inductance should in each case be so adjusted as to produce currents differing in phase by ninety degrees in the respective circuits. Once so adjusted this phase difference will remain constant under all frequencies, for, as already stated, in the condenser-circuit 35 the angle of lead $$\Theta_1 = \tan^{-1} \frac{1}{2\pi n\, C_1 R_1},$$

and similarly in the inductance-circuit 36 the angle of lag is $$\phi_2 = \tan^{-1} \frac{2\pi n\, L_2}{R_2},$$

where $n$ is the frequency, $C_1$ the capacity of the condenser 28, $L_2$ the inductance of the coil 30, and $R_1$ and $R_2$ the resistances of the respective circuits. The sum of these angles is $$X = \Theta_1 + \phi_2 = \tan^{-1} \frac{\frac{2\pi L_2 n}{R_2} + \frac{1}{2\pi C_1 R_1 n}}{1 - \frac{2\pi L_2 n}{R_2} \cdot \frac{1}{2\pi C_1 R_1 n}}$$

$$= \tan^{-1} \frac{4\pi^2 n^2 C_1 R_1 L_2 + R_2}{2\pi n (C_1 R_1 R_2 - L_2)},$$

and X becomes equal to a right angle when $$C_1 R_1 = \frac{L_2}{R_2}$$

independently of the value of $n$. Hence the phase difference between the branch circuits 35 and 36 remains constant at ninety degrees under varying frequency, though the actual shifting of the phases in the circuits depends upon the change in frequency.

Consider now the phase-diagram given in Fig. 2, which is a vector-diagram. Let the vector $Oa = E$ represent the impressed electromotive force—i. e., that of the mains 25—the counter-clockwise direction of rotation being, as usual, taken as positive. Then the chord $Ob$ of the circle $Oab$ described about $Oa$ as a diameter, said chord making the lead-angle $\Theta$ with $Oa$, may represent in direction and length the active electromotive force $E_c$ in the branch circuit 35, since, on well-known principles, $E_c = E \cos \Theta_1$. Similarly the chord $Oc$ of the circle making a lag-angle $\phi_2$ with $Oa$ is the active electromotive force $E_1$ of the branch circuit 36 and $E_1 = Oc = ba$, since the constants of the two circuits are adjusted to a constant-phase angle $bOc = \frac{\pi}{2} = Oba$ and $\angle Oab = \angle aOc = \phi_2$.

Now by the equations above given for $\Theta_1$ and $\phi_2$ it is seen that the former is an angle whose cotangent and the latter whose tangent is proportional to the frequency $n$; hence, if $n$ is increased or decreased the angle $\Theta_1$ will correspondingly decrease or increase and the point $b$ move around the circumference of the circle $Oab$ toward $a$ or $O$, respectively, and since the currents in the circuits 35 and 36 coincide in phase with the active electromotive forces $E_c$ $E_1$ the result will be to shift the poles of the magnetic field backward or forward with respect to the position they would have occupied had the frequency remained unchanged. Now consider the branch circuits 37 38 of the element B, which contain the coils 31 33, respectively. The capacity $C_3$ of the condenser 32 and the inductance $L_4$ of the coil 34 must be likewise adjusted to give active electromotive forces at ninety degrees with each other—that is, to have the relation $$C_3 R_3 = \frac{L_4}{R_4}.$$

Then the active electromotive force in the circuit 37 will be represented by the vector $Od$, where $d$ is a point on the circumference of the circle $Oab$, and that in the circuit 38 by the vector $da$. In other words, the phases of the current in the branch circuits 37 and 38, and hence those of the magnetic field in the ring B, will differ from the impressed electromotive force $E$ by angles depending upon the lead of the current in circuit 37, whose angle is $$\Theta_3 = \tan^{-1} \frac{1}{2\pi n\, C_3 R_3}.$$

Now supposing the element B to be in zero position when stationary and no current is passing through the instrument (or when there is a current of infinite frequency, which is the same thing) if an electromotive force of frequency $n$ be applied to its terminals the phases of the magnetic fields in A and in B will be advanced by different angles, so that the rotating magnet-poles of the two elements being no longer opposite each other the element B, which is free to rotate, will be turned through an angle $\psi$, at which point it will stop. The following theory will show how to determine this angle $\psi$. Take two coils one and two at right angles to each other and their magnetic circuits entirely of air. Call the currents $i_1$ and $i_2$, with maximum values $I_1$ and $I_2$, the instantaneous fields $Y_1$ due to $i_1$, and $Z_1$ due to $i_2$, and $k_1$ the proportional factor, so that $$Y_1 = k_1 i_1 \text{ and } Z_1 = k_1 i_2.$$

The resultant field $$X_1 = \sqrt{Y_1^2 + Z_1^2} = k_1 \sqrt{i_1^2 + i_2^2}.$$

Now if we had a second set of coils three and four also at right angles to each other then similarly $$X_2 = k_2 \sqrt{i_3^2 + i_4^2}.$$

Adjust the circuits so that $i_2$ lags ninety degrees from $i_1$ and also $i_4$ lags ninety degrees from $i_3$ and call $\phi$ the angle that $i_3$ lags with respect to $i_1$ or $i_4$ with respect to $i_2$, then $$i_1 = I_1 \sin \omega t, \quad i_2 = I_2 \cos \omega t,$$
$$i_3 = I_3 \sin (\omega t - \phi), \quad i_4 = I_4 \cos (\omega t - \phi).$$

Also the magnetic moment of a bar-magnet can be written equal to $\dfrac{a B 1}{4 \pi}$, where B is the number of lines of force per square centimeter, $a$ is the area of end face in square centimeters, and 1 is the length of the magnet. If placed in a field of intensity H and its axis inclined to the lines of force by an angle $\alpha$, then the moment tending to produce rotation of the magnet would be given by $$M = \frac{a B 1}{4 \pi} H \sin \alpha.$$

Now fix our two sets of coils concentric and assume one produces the H and the other the B of the above formula—that is, $H = X_1$ and $B = X_2$. Then $$M = \frac{a l}{4 \pi} k_2 \sqrt{i_3^2 + i_4^2} \cdot k_1 \sqrt{i_1^2 + i_2^2} \sin \alpha.$$

This gives the instantaneous moment, depending upon the phases of the currents. If the planes of coils one and three instead of coinciding differ by an angle $\psi$ and calling $\beta_1$ the angle of $X_1$ from the plane of coil one and $\beta_2$ the angle of $X_2$ from the plane of coil three, then $\alpha = \beta_1 - \beta_2 - \psi$, where $\alpha$ is the instantaneous angle between the two fields $X_1$ and $X_2$, it therefore follows that $$\sin \alpha = \sin \beta_1 \cos \beta_2 \cos \psi - \cos \beta_1 \sin \beta_2 \cos \psi$$
$$- \cos \beta_1 \cos \beta_2 \sin \psi - \sin \beta_1 \sin \beta_2 \sin \psi.$$

Now substituting for $$\sin \beta_1, \cos \beta_1, \sin \beta_2 \text{ and } \cos \beta_2$$

their values in terms of the instantaneous currents—that is, $$\sin \beta_1 = \frac{i_1}{\sqrt{i_1^2 + i_2^2}}, \&c.,$$

we obtain $$M = \frac{a l k_1 k_2}{4 \pi} \{ i_1 i_4 \cos \psi - i_2 i_3 \cos \psi - i_2 i_4 \sin \psi - i_1 i_3 \sin \psi. \}$$

Calling the time average of M by $M_T$, we obtain, by integrating for one period—i. e., one revolution of the fields, $$M_T = \frac{a l k_1 k_2}{4 \pi T} \int_0^T (i_1 i_4 \cos \psi - i_2 i_3 \cos \psi - i_2 i_4 \sin \psi - i_1 i_3 \sin \psi) \, dt$$

or $$M_T = \frac{a l k_1 k_2}{4 \pi \omega \cdot 2 \pi} \int_0^{2\pi} (i_1 i_4 \cos \psi - i_2 i_3 \cos \psi - i_2 i_4 \sin \psi - i_1 i_3 \sin \psi) \, d(\omega t.)$$

However, when equilibrium exists, $M_T$ must equal zero. From this it follows that if one set of coils is free to move it will turn until the value of $M_T$ is equal to zero, when we will have $$\int_0^{2\pi} (i_1 i_4 \cos \psi - i_2 i_3 \cos \psi - i_2 i_4 \sin \psi - i_1 i_3 \sin \psi) \, d(\omega t) = 0.$$

Substituting the values of $i_1$, $i_2$, $i_3$, and $i_4$ in terms of the maxima and $\omega t$ and performing the stated integration gives $$I_1 I_4 \cos \psi \cdot \pi \sin \phi + I_2 I_3 \cos \psi \cdot \pi \sin \phi -$$
$$I_2 I_4 \sin \psi \cdot \pi \cos \phi - I_1 I_3 \sin \psi \cdot \pi \cos \phi = 0,$$

from which $$\tan \psi = \frac{I_1 I_4 + I_2 I_3}{I_2 I_4 + I_1 I_3} \tan \phi.$$

In this equation $\phi$ is the phase angle between currents one and three or between currents two and four. $\psi$ is the actual angle moved by the movable set of coils, and $I_1$, $I_2$, $I_3$, and $I_4$ are the maximum values of the currents. They could also represent the effective values of the currents without changing the value of the fractional coefficient of $\tan \phi$. If $I_1 = I_2$, $I_3 = I_4$, or both of these equalities exist at one and the same time, $$\tan \psi = \tan \phi \text{ and } \psi = \phi$$

That is, if either or both fields are pure circular rotating magnetic fields and have a constant angular velocity, then $\psi = \phi$, but otherwise not.

Instead of using the values of the maximum or effective currents, in cases where the impressed electromotive forces are all equal it will be more convenient to use the impedances of the circuits. In this case $$\frac{I_1 I_4 + I_2 I_3}{I_2 I_4 + I_1 I_3} = \frac{J_1 J_4 + J_2 J_3}{J_2 J_4 + J_1 J_3},$$

remembering that $I_1 = \frac{e}{J_1}$, &c., where $J_1$ is the impedance and $e$ the maximum or effective voltage, according as $I_1$ is the maximum or effective current in circuit one. For an instrument as shown in Fig. 1 we will therefore have $$\tan. \psi = \frac{J_1 J_4 + J_2 J_3}{J_2 J_4 + J_1 J_3} \tan. \phi.$$

Now $\tan \phi$, after reduction is given by $$\tan. \phi = \tan. (\Theta_3 - \Theta_1) = \frac{(C_1 R_1 - C_3 R_3) \omega}{C_1 R_1 C_3 R_3 \omega^2 + 1}$$

call $\pi n$ by $\omega$. We therefore have $$\tan. \psi = \frac{J_1 J_4 + J_2 J_3}{J_2 J_4 + J_1 J_3} \times \frac{(C_1 R_1 - C_3 R_3) \omega}{C_1 R_1 C_3 R_3 \omega^2 + 1},$$

from which the scale can be calculated for any value of $\omega$ or $n$. The angle $\psi$ will be found to increase from zero up to a definite maximum and then decrease again to zero as the frequency varies from zero to infinity. The exact scale in each case will depend upon the values of the resistances, capacities, and inductances employed, and any particular instrument can be adapted for measurement of a certain range of frequency by the selection of the actual values of these quantities. This is of the form $$\tan. \psi = k \frac{a\, \omega}{b\, \omega^2 + 1},$$

where $a$ and $b$ are constants, and $K$ a function of $\omega$ or $n$.

It is by no means necessary that both elements A and B should produce rotating fields, as I have found that the instrument works equally well when one of the elements carries only an alternating magnetic field. This case is represented in Fig. 3, where the fixed element A and its connections are the same as before; but the movable element B' is in the form of a bar wound with a single magnetic coil and mounted to swing diametrically of A. The ends of the winding of B' are connected to the respective mains 25. This is, in fact, (approximately,) the limiting case of Fig. 1, in which $C_3 = 0$ when $L_4$ has a finite value, or $L_4 = \infty$ when $C_3$ has a finite value, (the ultimate result being the same whichever condition is assumed.) In other words, the circuit 37' or 37'' of the element B' is assumed as having either no inductance or an infinite capacity, the other branch circuit of the element B being here supposed open, corresponding to the conditions $C_3 = 0$, or $L_3 = \infty$. Either of these conditions is represented indifferently by either of the arrangements in Fig. 3, where the small condensers 32' 32'' are inserted in the circuits 37' 37'', the first simply in series with the resistance of the coil B', the second in parallel with a resistance R, and this combination in series with the resistance of the coil B'.

Introducing the condition that $C_3 = 0$ into the equations for $\phi$ and $\psi$, there results $$\tan. \phi = \tan.(\phi_4 - \phi_2) = \frac{a \omega}{b \omega^2 + 1} \text{ and } \tan. \psi = k \frac{a \omega}{b \omega^2 + 1},$$

where $a = \frac{L_4}{R_4} - \frac{L_2}{R_2}$, $b = \frac{L_4 L_2}{R_4 R_2}$, and $k = \frac{I_1}{I_2} = \frac{J_2}{J_1}$.

If, on the other hand, $L_4 = \infty$ we obtain $$\tan. \phi = \tan.(\Theta_3 - \Theta_1) = \frac{a \omega}{b \omega^2 + 1} \text{ and } \tan. \psi = k \frac{a \omega}{b \omega^2 + 1},$$

where $a = C_1 R_1 - C_3 R_3$, $b = C_1 R_1 C_3 R_3$, and $k = \frac{I_1}{I_1} = \frac{J_1}{J_2}$.

In Fig. 5 I have shown another manner of connecting my indicator with a single-phase circuit. Both rings A' and B' are wound with a three-phase (star or delta) winding. The terminal connections 39 and 40 are each branched, and one branch of each, 41 and 42, connected to different terminals of said winding on each ring. The other terminals of the rings are connected to the branch circuits 43 and 44, respectively, having each interposed therein a transforming device 45 and 46, each comprising an induction-coil 47 48 and a condenser 49 50, connected to its ends, the wires of the circuits 43 44 being connected to intermediate points of the induction-coils, and the constants of these coils should be such as to give a phase displacement of approximately one hundred and twenty degrees; but the constants of the two transforming devices 45 and 46 should be arranged to differ from each other in a manner similar to that already explained in the case of the construction of Fig. 1, so that the phase displacements in the circuits 43 44 will always differ from each other by a certain angle, varying with the frequency, and the derived currents in the ring windings will of course differ in like manner. Without analyzing the precise result it may be represented in a general way by Fig. 5ª, in which the vectors O' a', O' b', b' a' represent the relative phase-angles of the current in the respective windings of the element A'; O' a', O' d', d' a' in the element B'. The former combine to give a rotating magnetic field whose general direction may be represented by the vector O f, the latter, similarly one represented by the vector O g, making an angle $\phi'$ with O f. The result will be to turn the element B² through an angle equal to $\psi'$, when the poles of the two fields will coincide; but as this angle varies with the frequency, owing to the differing constants of the autotransformers, the angle at which B' will set itself will also vary with the frequency and may be represented by a pointer attached to B' and whose position is marked on a scale, in the manner already alluded to in the case of Fig. 1 and all as hereinafter more fully set forth.

Fig. 6 shows how the ring-and-bar instrument of Fig. 3 may be adapted to the three-phase split connection of Fig. 5, the member A' and its connections being all as shown in Fig. 5 and the member B' as shown in Fig. 3, except that the condenser 32' may be of any suitable size found to give the best results, and in place thereof I may employ an induction-coil 34' to produce lag in the circuit of B'.

In Fig. 7 are shown two forms of my instrument as applied to a three-phase circuit comprising mains 51, supplied by a three-phase generator 52. At the left is shown a double-ring instrument A' B', three-phase wound, as in Fig. 5; at the right a ring-and-bar instrument A' B', similar in construction to that shown in Fig. 6. In this case the terminals of the ring A' are connected by leads 53 directly to the respective poles of the circuit; those of the ring B' by wires 54 to the same poles, but with interposed condensers 55; those of the bar B' to any two poles of the circuit by the leads 37', with an interposed condenser 32'. We have seen that as soon as one of the fields is a purely circular rotating one, with constant angular velocity, K becomes equal to unity. This can be accomplished in Figs. 7 and 8, for the field produced by A can be made a purely circular one. Therefore $$\tan \psi = \tan \phi =$$
$$\tan(\Theta_3 - \Theta_1) = \tan(\phi_4 - \phi_2),$$

and consequently in any form of member B, whether ring or bar, whether having inductances or capacities, we have $$\tan \psi = \frac{2\omega}{b\omega^2 + 1}$$

by giving $a$ and $b$ their proper interpretations, as previously stated. This angle $\psi$ is zero at $n = 0$ and $n = \infty$, and between these values it has a maximum with respect to the frequency, found, as usual, by placing $$\frac{d\psi}{d\omega} = 0,$$

which gives $$\omega_m = \sqrt{\frac{1}{b}},$$

or $$n_m = \frac{1}{2\pi}\sqrt{\frac{1}{b}},$$

where $n_m$ means frequency for maximum deflection. This shows that as the frequency increases the angle $\psi$ will increase up to the value $$\tan \psi_1 = \frac{\alpha\sqrt{\frac{1}{b}}}{b\frac{1}{b}+1} = \frac{\alpha}{2}\sqrt{\frac{1}{b}} = \sqrt{\frac{\alpha^2}{4b}}$$

corresponding to the above-given value for the frequency and will then decrease again for higher frequencies. Moreover, the rate of change of the angle $\psi$ will be variable and will be the least or a minimum about five-sixths, the above-given maximum value of $\psi$. Hence the scale of the instrument (indicating the angle of rotation of the element B) is to be graduated, as in Fig. 2$^a$.

By selecting the values for $a$ and $b$ the instrument can be given a definite value for its maximum deflection and at such a frequency as will put the least sensitive point at a higher frequency than will be reached in practice and also the returning part of the scale thus omitted. If now circuits of A lead and those of B lag, or vice versa, we obtain $$\tan \psi = \frac{\alpha \omega^2 + 1}{b\omega}$$

where $$\alpha = \frac{C_1 R_1 L_3}{R_3} \text{ and } b = \left(C_1 R_1 - \frac{L_3}{R_3}\right).$$

This angle $\psi$ is ninety degrees for $n = 0$, and again ninety degrees for $n = \infty$. It will be a minimum when $$\omega_m = \sqrt{\frac{1}{\alpha}} \text{ or } n_m = \frac{1}{2\pi}\sqrt{\frac{1}{\alpha}}.$$

The minimum angle will be given by $$\tan \psi_1 = \sqrt{\frac{4\alpha}{b^2}}.$$

The least sensitive point will be near the minimum value of $\psi$, the only difference being that this scale the pointer moves in the opposite direction from the preceding with increase of frequency. Furthermore, if the phase angles of one member are made negligibly small by introducing non-inductive resistances in these circuits we have $$\tan \psi = \tan \Theta_3, \tan \psi = -\tan \Theta_1, \tan \psi = \tan \phi_4, \tan \psi = -\tan \phi_2,$$

a condition of things represented graphically in Fig. 4. The angle of rotation of B will therefore be in this case equal to the phase displacement in the branch circuits of the other member, and its tangent is proportional to the frequency or inversely proportional to the frequency. Hence the frequency could in this case be measured directly on a uniformly-divided scale, on which a spot of light is thrown by a mirror attached to the element B at the center. For an ordinary instrument with the pointer the scale assumes the form shown in Fig. 4$^a$, in which, as the above equations show, the maximum angle of swing is fixed at ninety degrees, and the graduations are arranged as on the lower scale of Fig. 2$^a$, being, however, (theoretically,) strictly arcs whose tangent is proportional to or inversely proportioned to the corresponding frequency, and hence giving approximately uniform range of accuracy, the upper scale of Fig. 2$^a$ and maximum point $\psi_2$ disappearing altogether.

In Fig. 8 are shown the same arrangements as applied to a two-phase circuit, comprising mains 56, supplied with current by a generator 57. The double-ring instrument (shown at the left of the figure) has its members $A^2$ $B^3$ both four-phase wound, the connections 58 of the fixed member being connected directly to the mains 56, while two of the connections 59 of the movable member have interposed condensers 60. By connecting each pair of opposite quarter-coils of $B^3$ in series, as shown by connections 61, the necessity of more than two condensers is avoided. In like manner the terminals of B' in this figure are connected to a pair of opposite phased mains 56 with the interposed condenser 32'.

It is not necessary to include a condenser or condensers in the circuits of the movable coil, Figs. 3, 6, 7, and 8, (theoretically at least,) provided the inductance of the A circuits be sufficiently different from those of the B circuits to produce a measurable difference in the angles of phase displacement produced by the change of frequency to be measured. Thus the condensers 32', 55, and 60 might be omitted altogether or even replaced by inductances, as at 34' in Fig. 6.

Having now described the theory of my invention, I will illustrate some practical embodiments thereof. Referring first to Figs. 9 to 14, a form is illustrated which may be made for any of the connections shown in Figs. 1 to 8, being provided with a fixed ring A' and a movable ring $B^2$, mounted to rotate centrally thereof. This instrument is to fix ideas particularly designed for connection, as on the left of Fig. 7—i. e., a double-ring connection to a three-phase circuit. For a ring-and-bar connection the ring $B^2$ might be wound in two semicircular coils to give an alternating field or might be replaced by a straight bar. The fixed ring A' is supported on a set of three insulating-standards 62 and secured thereto by straps 62ª, which standards are fixed in the base-block 63 and serve also to support on their ends a wooden plate 64, on which is fixed the dial 65 and which has at its center a ball-bearing 66, receiving the upper end of a vertical shaft 67, mounted centrally of the instrument and resting in a jeweled step-bearing 68, which is fixed in an adjustable bearing-block 69 by a pair of wood or fiber disks 70 71, conforming to the shape of the ring and clamped together by a long threaded sleeve 72, which engages with the threaded upper end 73 of the shaft, coacting with a shoulder 74, formed on the shaft below the disk 71, which rests on an interposed washer 75. The sleeve 72 may be formed polygonal at its lower end, as at 76, whereby it may be turned with a wrench, but above, cylindrical, acting as a journal which is slidable longitudinally in the ball-bearing 66. The shaft is capped by a nut 77, also engaging with the threaded end and which clamps in position the index-finger or pointer 78 between it and the upper end of the sleeve 72. With this pointer coöperates the scale 79 of the instrument formed as above described, Fig. 4ª, upon the dial-plate 65. To adjust the ring $B^2$ vertically to a proper relation with the fixed ring A', the bearing-block 69 is arranged to slide vertically in the central aperture 80 of the base, and its lower surface is cut off obliquely, as at 81, to correspond with the upper surface of a wedge-shaped adjustable block 82, which slides horizontally in a channel 83 in the under side of the base, being maintained therein by a plate 84, covering the open side of the channel. This block 82 may be adjusted by a set-screw 85, whose threaded end 86 engages with a threaded socket 87 in the block 82 and which is prevented from moving longitudinally in the base by a collar or boss 88 thereon, which engages with the plate 89. The screw is operated from the side of the instrument by a milled head 90. I also prefer to provide means for arresting or checking the motion or vibration of the pointer, said means, as here shown, comprising a forked angle-lever 91, pivoted at 92 upon ears 93, fixed on the base. The forked end 94 of this lever straddles the shaft 67, its two limbs being knuckle-shaped, as shown, and projecting into proximity with the washer 75. The other arm 95 of this lever extends downwardly into a recess 96, cut in the base, and against its lower end presses the end of a screw-stem 97, passing through a radial bore 98 in the base and bearing a threaded portion 99, engaging with the socket-block 100. This screw is likewise manipulated by a milled head 101, and it will be seen that by turning this head, so as to cause the screw-stem 97 to advance inwardly, the forked end 94 of the lever 91 is gently pressed against the washer 75, so as to take a certain portion of the weight of the ring B and its shaft from its bearing, and thus exercise a nicely-adjustable braking action. Although the condensers 55 may of course be mounted and attached separately, I have herein shown them as conveniently mounted in the base, or rather in a separate chamber under the base. They may be made of sectorial form of one hundred and twenty each, as shown, backed by an insulating-disk 102 and separated by radial insulating-partitions 103, through which pass bolts 104, securing the whole to the base 63. At 105 are shown the three main terminals of the instrument, which are to be connected in use directly to the respective poles of the circuit and from which the proper connections are made to the respective rings and condensers.

The instrument as a whole may be provided with a suitable cylindrical casing 106, secured to the base by screws 107 and closed at one end, as at 108, in which is formed an opening covered by a glass plate 109 over the scale 79, through which the movements of the pointer can be observed.

The other embodiment of my invention, Figs. 15 to 20, shows how it may be adapted to the well-known Weston type of portable electrical instrument. It comprises the usual base-block 110 of rectangular form and generally sector-shaped casing 111, fitting over a raised circumferential rib 112 on the base, said casing being provided with a square chamber 113, which receives the operating mechanism, and an arcuate opening closed by a glass plate 113ª over the chamber 113, through which the operating mechanism is visible.

The type of instrument shown in Fig. 16 (for single-phase circuits with a three-phase split connection) has been selected for illustration. In this case the fixed element A³ assumes the form of a circular yoke or ring having three pole-pieces 116 117 118 projecting inwardly at angles of one hundred and twenty degrees and having each a coil 119 mounted thereon. The movable element B⁴ assumes the form of a rectangular open frame or bobbin 120, carrying a single coil of wire 121. This coil is mounted on the vertical spindle 122, passing through its center and journaled at its ends in jeweled pivot-bearings 123 124, which are carried by straps 125 126, secured to the pole-yoke A. On the upper end of the spindle 122 is mounted the index 127, which coöperates with the scale 115, the latter being fixed to or marked on the mirror 128, which is directly beneath the pointer and which is in turn secured to a plate 129, mounted on posts 130, fixed to the base. Beneath the plate 129 are located the two condensers 32' and 49 and the choke-coil 47, the former being sectorial in shape and secured to the base by ears 131, while the latter is mounted on the smaller condenser and secured to the casing thereof by straps 132. At opposite sides are the two main terminals 133 134 of the instrument, which, as shown, are connected by the wires 37 39 40 41 42 43 to the several coils and condensers, precisely as shown diagrammatically on the left of Fig. 6. The instrument may be provided with the usual brake or stop mechanism operated by a press-button 135.

From the above description it will be understood that I do not limit myself to any specific construction of the instrument; but my invention covers all forms of frequency-meter which embody the principle thereof as above clearly set forth.

Having thus described my invention, what I claim as new, and desire to secure by Letters Patent, is—

1. A frequency-meter for alternating-current circuits comprising a fixed and a movable element, which carry rotating magnetic fields which interact on each other, both elements having energizing-coils, and means for connecting the circuits of said coils in parallel to the terminals of the circuit to be measured, the constants of said circuits differing from one another.

2. A frequency-meter for alternating-current circuits comprising a fixed and a movable element, each having coils wound to produce a rotating magnetic field, which fields interact on one another to cause the movable element to assume a position depending on the relative phase displacement of the two fields, both elements having energizing-coils, means for connecting the circuits of the respective coils in parallel to the circuit to be measured and across the poles thereof, and a capacity inserted in one of said circuits whereby a relative phase displacement of said circuits is produced.

3. A frequency-meter for alternating-current circuits comprising a fixed and a movable element, each having coils wound to produce a rotating magnetic field, which fields interact on one another to cause the movable element to assume a position depending on the relative phase displacement of the two fields, both elements having energizing-coils, means for connecting the circuits of the respective coils in parallel to the circuit to be measured and across the poles thereof, and an inductance inserted in one of said circuits whereby a relative phase displacement of said circuits is produced.

4. A frequency-meter for alternating-current circuits comprising a fixed and a movable element, each having coils wound to produce a rotating magnetic field, which fields interact on one another to cause the movable element to assume a position depending on the relative phase displacement of the two fields, both elements having energizing-coils, means for connecting the circuits of the respective coils in parallel to the circuit to be measured and across the poles thereof, and a capacity inserted in one of said circuits, and an inductance in the other of said circuits whereby a relative phase displacement of said circuits is produced.

5. A frequency-meter for alternating-current circuits comprising a fixed element and a movable element, means for producing a rotating magnetic field in each of said elements having the frequency of the circuit to be measured, whereby said movable element is caused to be moved until the two fields coincide in angular position, means for causing a relative phase displacement of the two fields depending in magnitude upon the frequency, and means for measuring the angle of movement of said movable element.

6. A frequency-meter for alternating-current circuits comprising a fixed element and a movable element, means for producing a rotating magnetic field in each of said elements having the frequency of the circuit to be measured, whereby said movable element is caused to be moved until the two fields coincide in angular position, means for causing different phase displacements, each a function of the frequency, in the two coils and thus causing an angular movement of said movable coil equal to the difference between said phase displacements and also a function of the frequency, and means for measuring said angular movement.

7. An electric meter having a scale graduated approximately according to the formula $$\psi = \tan^{-1} \frac{an}{bn^2 + 1},$$

where $n$ represents the frequency, and hence graduated in opposite directions above and below a predetermined magnitude $\psi$, respectively.

8. An electric meter having a scale graduated approximately according to the formula $$\psi = \tan^{-1} an,$$

where $n$ represents the frequency, and hence having a scale whose graduations are so spaced as to give an approximately uniform range of accuracy.

9. A frequency-meter for alternating-current circuits comprising a fixed element and a movable element, means for producing a rotating magnetic field in one of said elements having the frequency of the circuit to be measured, means for producing a varying magnetic field of the same frequency interacting with the first in the other element, whereby said movable element is caused to be moved until the two fields coincide in angular position, means for causing a phase displacement $$\Theta_1 = \tan^{-1} \frac{1}{an}$$

in one of said magnetic fields, means for causing a phase displacement $$\Theta_2 = \tan^{-1} \frac{1}{bn}$$

in the other magnetic field, whereby said movable element is caused to move through an angle $$\psi = \tan^{-1} \frac{1}{bn} - \tan^{-1} \frac{1}{an},$$

and means for measuring said angle $\psi$.

10. A frequency-meter for alternating-current circuits comprising a fixed element and a movable element, means for producing a rotating magnetic field in one of said elements having the frequency of the circuit to be measured, means for producing a varying magnetic field of the same frequency interacting with the first in the other element, whereby said movable element is caused to be moved until the two fields coincide in angular position, means for causing a phase-lead $$\Theta = \tan^{-1} \frac{1}{an}$$

in one of said magnetic fields whereby said movable coil is given a proportional angular movement, and means for measuring said angular movement.

11. A frequency-meter for alternating-current circuits comprising a fixed element and a movable element, means for producing a rotating magnetic field in each element having the frequency of the circuit to be measured and means for causing a relative phase displacement of said fields whose magnitude is a function of the frequency.

12. A frequency-meter for alternating-current circuits comprising a fixed element and a movable element, means for producing a rotating magnetic field in each element having the frequency of the circuit to be measured, means for causing a relative phase displacement of said fields whose magnitude is a function of the frequency, whereby said movable element is caused to rotate through the same angle, and means for measuring the angle of rotation of said movable element.

13. A frequency-meter comprising a fixed ring having magnetizing-coils wound to produce a rotating field, a movable element within said ring rotatable about a central axis and also having magnetizing-coils, the circuit constants depending on capacity and inductance having different values for the two coils, said coils being connected in parallel to the terminals of the instrument, a stationary scale graduated in frequencies, a pointer mounted on said movable element and coöperating with said scale, and a manually-operated brake adapted to check the movement of said movable element.

In testimony whereof I have hereunto subscribed my hand and affixed my seal this 16th day of September, 1903.

WILLIAM H. FREEDMAN. [L. S.]

Witnesses:
F. W. WHITCOMB,
P. S. GARDINER.